(12) United States Patent
Hinds et al.

(10) Patent No.: US 8,406,786 B2
(45) Date of Patent: Mar. 26, 2013

(54) METHODS AND APPARATUS FOR EXTENDED GENERIC MESSAGING IN A NETWORKED GEOLOCATION SYSTEM

(75) Inventors: Mark Hinds, Libertyville, IL (US); Jignesh Dixit, Schaumburg, IL (US); Jason Koh, Round Lake, IL (US)

(73) Assignee: Motorola Mobility LLC, Libertyville, IL (US)

( * ) Notice: Subject to any disclaimer, the term of this patent is extended or adjusted under 35 U.S.C. 154(b) by 384 days.

(21) Appl. No.: 12/712,392

(22) Filed: Feb. 25, 2010

(65) Prior Publication Data
US 2011/0207469 A1 Aug. 25, 2011

(51) Int. Cl.
*H04W 68/00* (2009.01)
(52) U.S. Cl. ..................... 455/456.1; 455/458
(58) Field of Classification Search ............... 455/456.1, 455/419, 456.2; 342/450, 451, 357.359; 370/326, 342, 345, 320, 338
See application file for complete search history.

(56) References Cited

U.S. PATENT DOCUMENTS

| | | | |
|---|---|---|---|
| 4,454,578 A * | 6/1984 | Matsumoto et al. | 712/204 |
| 7,149,534 B2 | 12/2006 | Bloebaum et al. | |
| 7,277,049 B2 | 10/2007 | Korneluk et al. | |
| 2006/0063519 A1 * | 3/2006 | Rajaram | 455/419 |
| 2006/0246919 A1 * | 11/2006 | Park et al. | 455/456.1 |
| 2007/0037585 A1 | 2/2007 | Shim | |
| 2007/0182547 A1 | 8/2007 | Wachter | |

* cited by examiner

*Primary Examiner* — Kiet Doan

(57) ABSTRACT

Generic messaging and protocols are provided for handset-to-handset communications in accordance with, for example, the Secure User Plane Location (SUPL) protocol. A mobile device initiates a geolocation-related session with a second mobile device by sending a message, including a payload, to a server (e.g., an H-SLP server) over a network. A data connection is the established between the second mobile device and the server in response to the message. A message, including the payload, is then sent to the second mobile device. The payload may include geolocation (e.g., GPS) information, such that two mobile devices may collaboratively share information regarding the other's geographical location.

8 Claims, 4 Drawing Sheets

METHODS AND APPARATUS FOR EXTENDED GENERIC MESSAGING IN A NETWORKED GEOLOCATION SYSTEM

The present invention generally relates to geolocation used in connection with mobile devices, and more particularly relates to the use of generic messaging in the context of geolocation protocols such as the Secure User Plane Location (SUPL) protocol.

BACKGROUND

It is increasingly common to incorporate geolocation services and location-aware applications within mobile devices, particularly "smart-phones," PDAs, netbooks, and the like. Accordingly, it is not unusual for the user of a mobile device to interact with an external network host or server that requests information regarding the geographical location of the user. In such a case, a "geolocation session" is typically established in which the mobile device exchanges location data with an external server. This geolocation session can last for a significant length of time, may involve the transmission of assistance data and location fixes, and may be based on a specified period, on proximity, or on geo-fencing limits (i.e., presence within a specified geometric area). One popular method of providing location information involves the use of the Secure User Plane Location (SUPL) protocol developed by the Open Mobile Alliance (OMA).

Currently known SUPL protocols and other such geolocation methods are, however, unsatisfactory in a number of respects. For example, in the context of currently known SUPL systems, it is difficult to support generalized handset-to-handset use cases—for example, collaborative location monitoring between smartphones and other mobile devices.

Furthermore, as current SUPL handset-to-handset communication is enabled by a network-side server (a Home SUPL Location Platform, or "H-SLP"), any modifications to the protocol would require that both the mobile devices and the network-side server be modified, which can be costly and time-consuming. Finally, as the H-SLP provides decoding and parsing of incoming messages, privacy issues can arise with respect to messages stored at the H-SLP.

Accordingly, there is a need to provide secure handset-to-handset generic messaging within modern geolocation protocols. Other desirable features and characteristics of the present invention will become apparent from the subsequent detailed description and the appended claims, taken in conjunction with the accompanying drawings and the foregoing technical field and background.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

In general, the present invention relates to systems and methods for providing generic messaging and protocols between mobile devices that communicate in accordance with, for example, the Secure User Plane Location (SUPL) protocol.

The following detailed description is merely illustrative in nature and is not intended to limit the invention or the application and uses of the invention. Furthermore, there is no intention to be bound by any expressed or implied theory presented in the preceding technical field, background, brief summary or the following detailed description. For the purposes of conciseness, conventional techniques and principles related to user interface components, the SUPL protocol, network communication, geolocation, mobile computing devices, and the like, need not be described herein.

Figure 1:
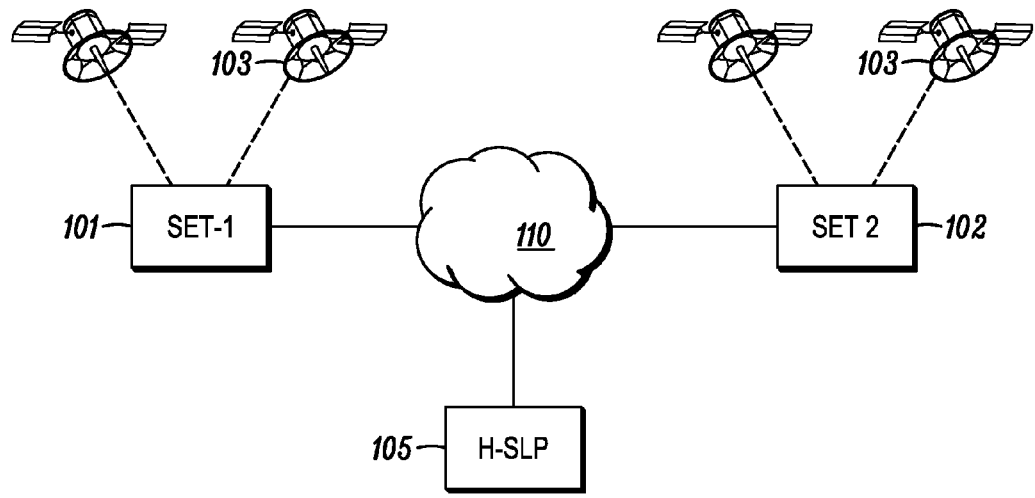
FIG. 1 depicts a wireless network system useful in describing the present invention.

Referring now to FIG. 1, an example wireless network useful in illustrating operation of the present invention will now be described. As a threshold matter, the system and many of its components are described herein in the context of a Secure User Plane Location (SUPL) protocol (see, e.g., http://www.openmobilealliance.org; note that this Standard is a work in progress at the time of writing, and will evolve). It will be appreciated, however, that the SUPL protocol is referred to herein without loss of generality, and that the present embodiments are not so limited. Thus, the terms "mobile device," "SET," and "handset" may be used interchangeably herein.

As shown, a mobile device 101 (e.g., a SUPL Enabled Terminal, or "SET") is capable of establishing, via one or more networks 110 (e.g., the Internet, one or more LANs, etc.), a geo-location-related session (or simply "geolocation session") with a remotely located server 105 (also referred to as an "H-SLP" (Home SUPL Location Platform) or simply "server"). A second mobile device ("SET-2") 102 may similarly take part in the geolocation session as is understood from the SUPL protocol. Each mobile device 101, 102 will typically include a SUPL agent configured to provide an interface to the SUPL protocol, as is known in the art.

During a geolocation session, mobile devices 101 and 102 receive information regarding their respective geographic locations. This information may be acquired in a number of ways, including, for example, via GPS satellites 103, WiFi geolocation information, or the like, and the acquisition of this information may or may not have been facilitated by communications with server 105, using a suitable protocol.

Geolocation information may be exchanged continuously (at predetermined intervals), or only when the user (i.e., mobile device 101 or 102) enters a particular geographical region—a practice known as "geo-fencing." In other embodiments, location information is exchanged based on proximity to a particular geographical location.

As mentioned previously, it is advantageous for mobile devices 101 and 102 to engage in various forms of location-based messaging between themselves—that is, with H-SLP 105 acting as a relatively simple geolocation-related "conduit" or "pipeline" for messages, rather than parsing and decoding the messages as in standard SUPL scenarios. It is further desirable that such messaging be initiated by the mobile devices ("SET-initiated"), rather than by the network or other component connected to the network (i.e., "network-initiated").

Figure 3:
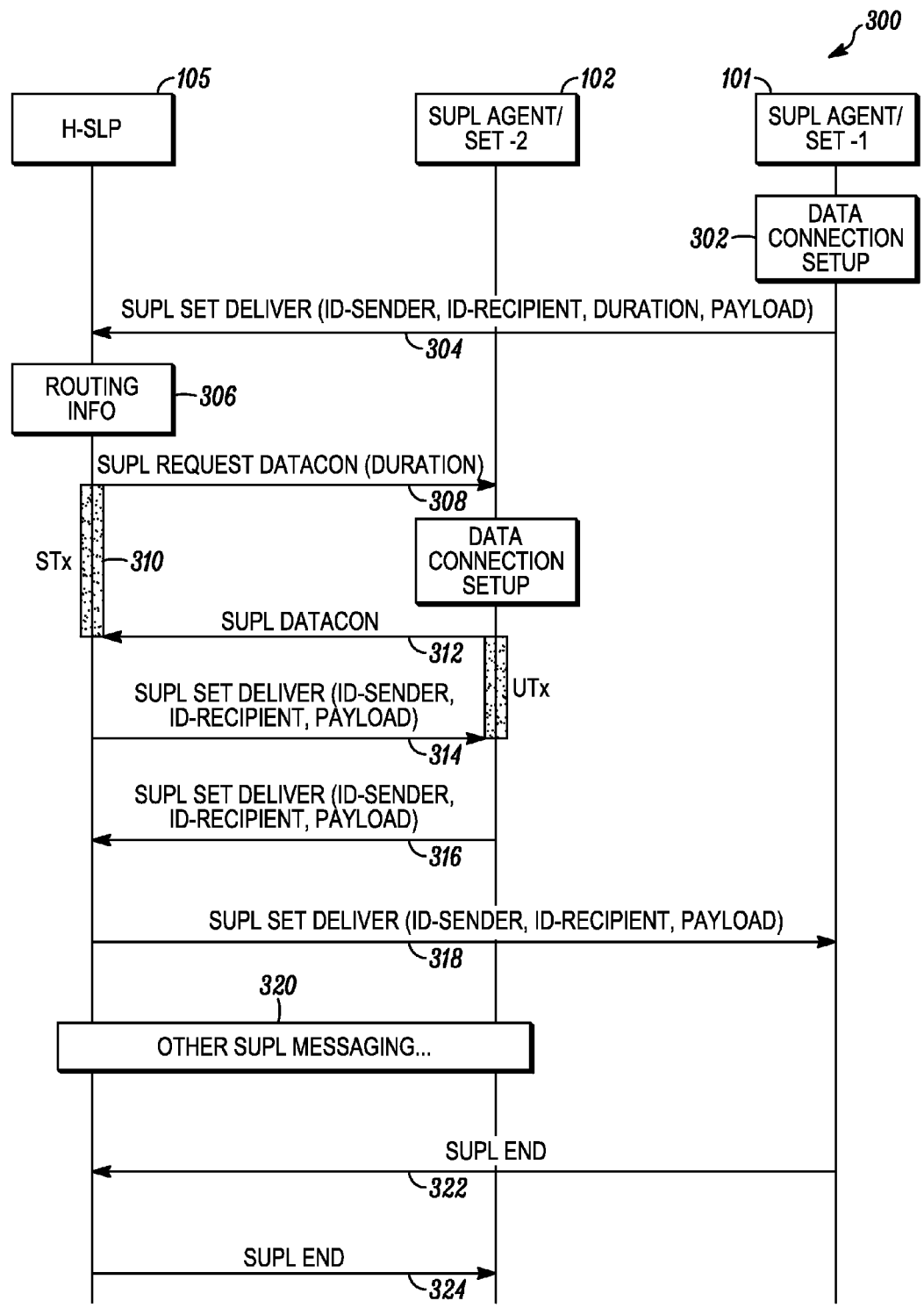
FIG. 3 depicts a partial messaging protocol in accordance with one embodiment.

Accordingly, FIG. 3 illustrates an exemplary generic messaging protocol 300 within the context of SUPL that is appropriate for providing SET-initiated, SET-to-SET functionality. In general, the illustrated implementation includes a generic SUPL container message and certain support messages that, together, create a message pipeline analogous to that provided in traditional SUPL positioning messaging, but which also provide SET-to-SET functionality.

With continued reference to FIG. 3, it will be assumed that the SUPL Agent on mobile device 101 (SET-1) intends to execute a use case (i.e., scenario) that makes use of generic extension messaging between itself and another mobile device 102 (SET-2). Using mechanisms which may be outside the scope of the SUPL protocol, it is further assumed that SET-1 has a priori access to the contact information for SET-2.

First, in step 302, SET-1 101 takes appropriate action to establish, resume, or continue a secure connection to H-SLP 105. This may performed in accordance with conventional data communication methods used in connection with traditional SUPL devices.

To initiate handset-to-handset communication, SET-1 101 (in step 304) first sends a message to H-SLP 105—i.e., what will be referred to herein, without loss of generality, as a SUPL SET DELIVER message. In the illustrated embodiment, this message preferably contains two SET IDs, an optional persistent connection duration, and a message payload. The first Target SET ID (id-sender) specifies the sending SET (SET-1 101 in this example), and the second Target SET ID (id-recipient) specifies the receiving SET (SET-2 in this example). These IDs preferably correspond to the standard SUPL identifiers known in the art.

The duration value indicates the intended length of time of the session. When the duration parameter representing a period of time is specified by the sending SET, thus requesting a "persistent" session, the system optimizes the communication with the assumption that a series of back-and-forth communications will occur between the participating SETs. If a duration is absent, then the intent is to end the session once the payload has been delivered.

If present, the "persistent" connection duration is preferably granted by the SLP or SLPs involved in the connection. Whether it is granted or not, the system nevertheless delivers at least the message payload to the target SET (i.e. id-recipient). In such a case, the SLP(s) involved preferably omit the duration parameter from subsequent messages during the session.

The payload itself may have any format and content, depending upon the nature of the protocol or messaging desired in a particular context. The details of the message payload would typically be specified elsewhere, for example in Network-Operator-Customer requirements.

In step 306, determines the appropriate routing information for subsequent messaging; in this example, it determines that the SET is directly accessible, without involving other SUPL protocol nodes.

In step 308, H-SLP 105 sends a SUPL REQUEST DATACON message to SET-2 102 (preferably using the same transport used for a SUPL INIT message). This message contains an optional persistent connection duration, which, if present, shall be the same as that originally requested by SET-1 101.

As before, the persistent connection duration requested by the SET is an optimization for cases where a series of back-and-forth communications are expected between the participating SETs. If duration is absent, then the intent is to end the session once the payload has been delivered. The persistent connection duration requested should be granted by SET-2 102, but whether granted or not, SET-2 102 at least waits until receipt of the target payload from the SLP before closing the connection.

Next, in step 310, SET-2 102 establishes a secure connection to H-SLP 105.

In step 312, SET-2 102 sends a SUPL DATACON message to H-SLP 105, thus confirming that it is prepared to process further messages.

H-SLP 105 then sends a SUPL SET DELIVER message to SET-2 102 (step 314). This message contains two Target SET IDs (id-sender and id-recipient) and a message payload, unchanged from step 304. As in step 304, the first ID specifies the sending SET (SET-1 101 in this example), and the second ID specifies the receiving SET (SET-2 102 in this example).

Illustrating a use case extension where messaging between SETs 101 and 102 is two-way, in 316 and 318, SET 102 may send back a message to SET-1 101 as described above (reversing the values of id-sender and id-recipient). Further messaging may take place, as depicted in step 320, which represents possible additional SUPL messaging using SUPL SET DELIVER messages as described above. Alternatively, this could represent a separate SUPL session, such as one involving positioning, with output used by this session.

It is expected that all participating SETs and SLPs will maintain internal timers to keep track of the persistent connection duration requested by SET-1 101. Separately from these duration timers, local fixed timers such as STx and Utx may also be required.

On timer expiration, or when one of the participating SETs/SLPs needs to shut down the connection for any reason, a SUPL END message is sent by that SET/SLP to all other SETs/SLPs participating in that SUPL session.

Thus, an SLP will send SUPL END to the two SETs (101, 102) to which it is connected. Similarly, a SET will send a SUPL END to its SLP, and this will result in a second SUPL END message being sent by the SLP to the other participating SET(s). This latter case is illustrated in steps 322 and 324. That is, In step 322, SET-1 101 intends to end the SUPL session, and sends a SUPL END message to H-SLP 105. Upon being informed by SET-2 102 that the SUPL session has ended, H-SLP 105 sends a SUPL END message to SET-2 102.

Figure 4A:
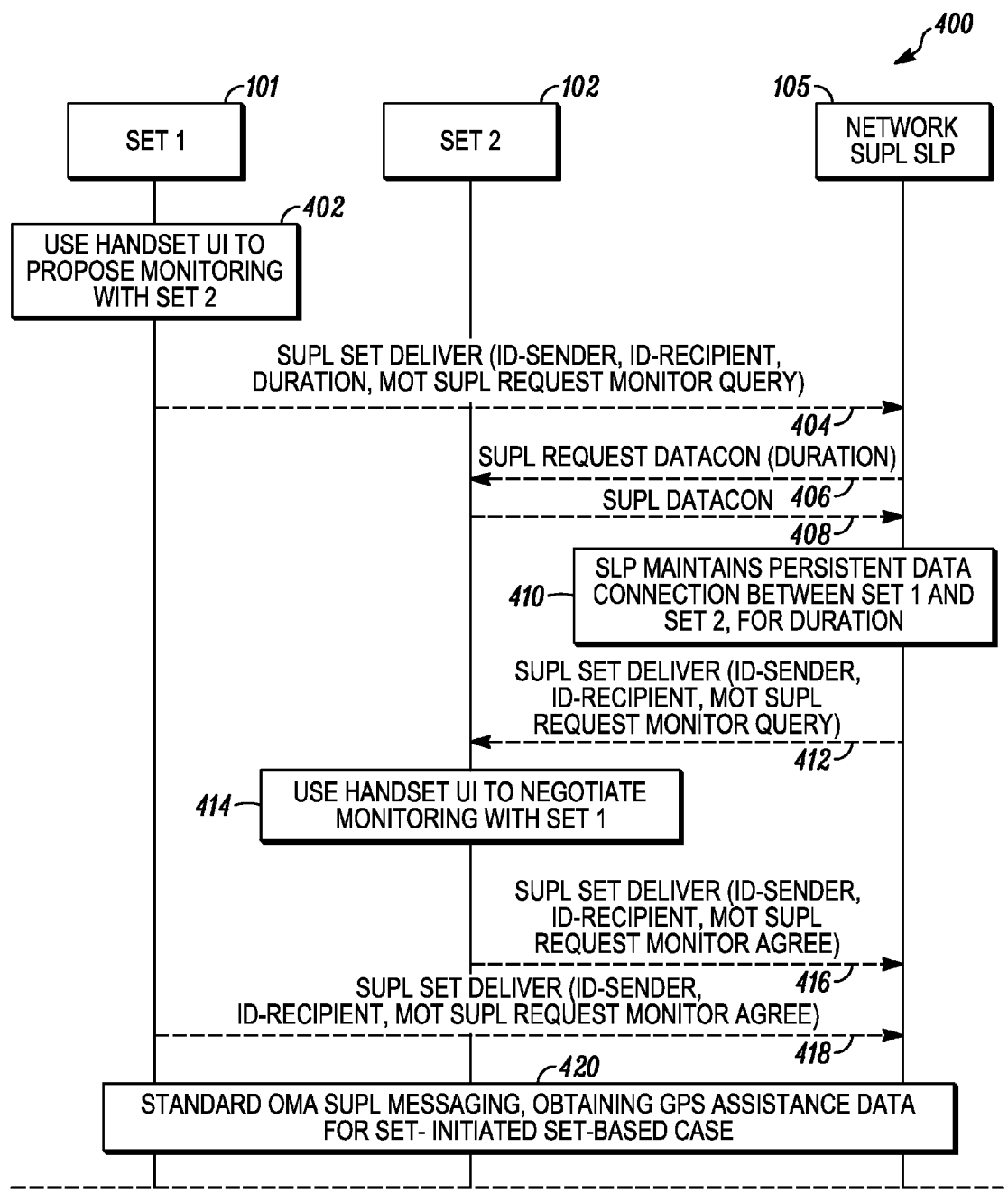
FIG. 4 depicts a partial messaging protocol in accordance with a particular embodiment.
Figure 4B:
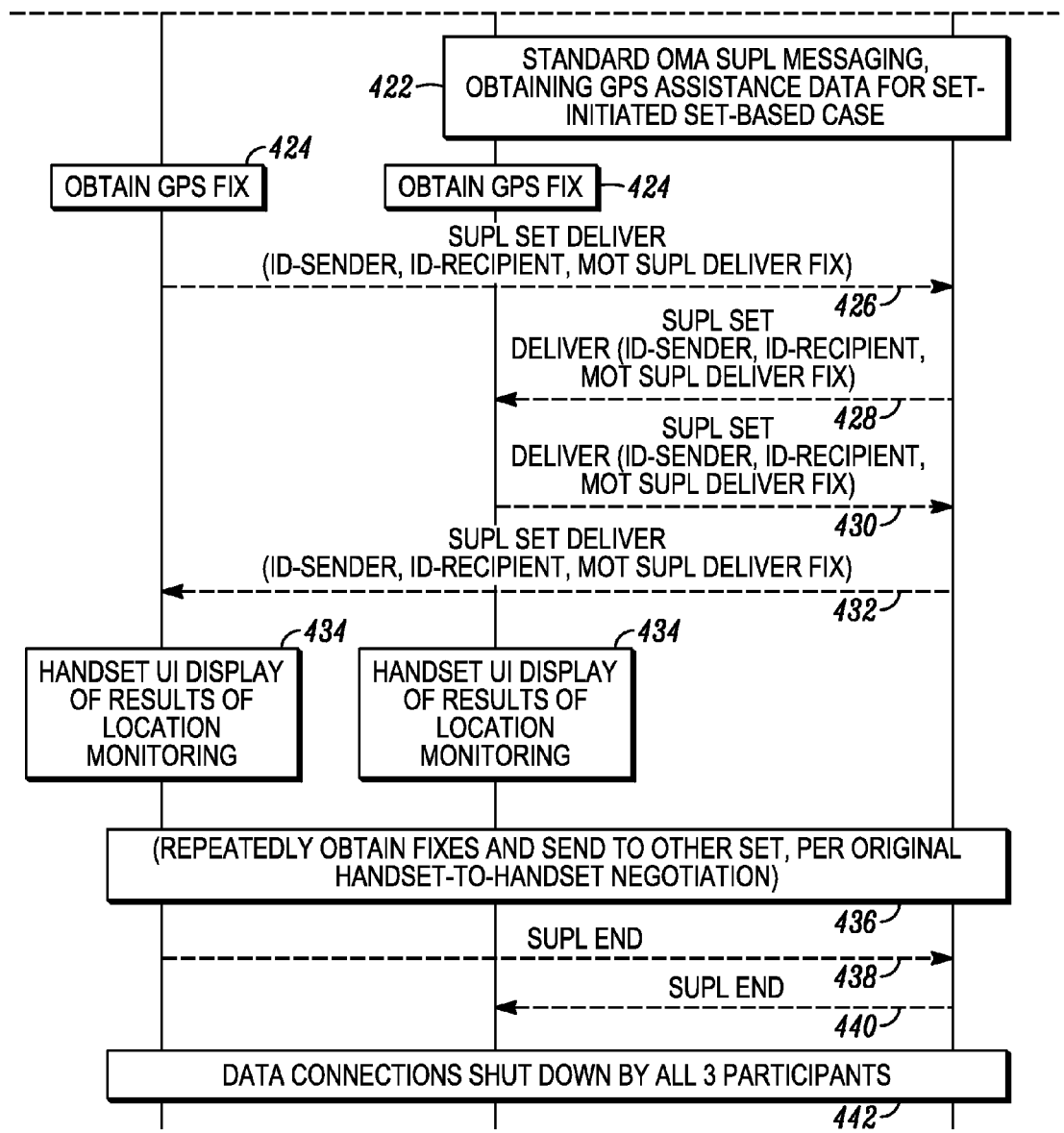

Having thus described a general method for providing generic handset-to-handset communication in the context of SUPL, a particular example involving collaborative handset-to-handset monitoring will now be described in conjunction with FIG. 4.

As illustrated, method 400 is initiated by a handset (in this case, SET-1 101), which proposes monitoring with a second handset (SET-2 102) (step 402). This step may be initiated, for example, by a user interacting with a suitable user interface provided on SET-1 101, as is known in the art.

Next, in step 404, SET-1 101 sends a SUPL SET DELIVER message to H-SLP 105. As described above in connection with FIG. 3, this message includes a sender ID (SET-1), a recipient ID (SET-2), a duration, and a message payload. In this case the message payload corresponds to what will be termed a "MOT SUPL request monitor query" message. This message may take any form, but in general includes any combination of characters expressing an intent to enter into a handset-to-handset monitoring session.

In step 406, H-SLP 105 sends a SUPL REQUEST DATACON message to SET-2 102 as described above, and in return SET-2 102 sends a SUPL DATACON message to H-SLP 105.

At this point, H-SLP 105 maintains a persistent data connection between SET-1 101 and SET-2 102 for the requested duration.

In step 412, H-SLP 105 forwards the previous payload of step 404 (i.e., the "MOT SUPL request monitor query") to SET-2 102. SET-1 102 then negotiates monitoring with SET-1 101 using any suitable user interface (step 414).

Subsequently, in step 416, SET-2 102 sends a SUPL SET DELIVER message to H-SLP 105 including a "request monitor agree" message—that is, any series of characters indicating an assent to the previous request (initiated in step 404) re establishing a monitoring session. This "request monitor agree" message is then forwarded to SET-1 101 (step 418).

In steps 420 and 422, standard OMA SUPL messaging takes place between SET-1 101, SET-2 102, and H-SLP 105 to obtain GPS assistance data associated with each of the handsets. Subsequently, in step 424, SET-1 101 and SET-2 102 obtain a GPS fix in the conventional manner.

Once their respective locations are determined (via GPS, WiFi, etc.), each handset sends that information to the other handset. That is, as shown in steps 426, 428, 430, and 432, SET-1 101 sends a "MOT SUPL deliver fix" payload to SET-2 102 via H-SLP 105, and SET-2 102 sends a "MOT SUPL deliver fix" payload to SET-1. The location fix information may have any convenient syntax and format.

In steps 434, handsets SET-1 101 and SET-2 102 each display the results of the geolocation monitoring—i.e., the GPS location of the other handset. For example, the location may indicated by superimposing an icon on a two-dimensional map of the area.

In step 436, the handsets may continue to share and display GPS information as depicted in steps 424-234, followed by closing of data connections (step 442) after conventional "SUPL END" messages have been shared as depicted in steps 438 and 440.

The user interface provided to implement such the method described above may vary depending upon, for example, the hardware and software platforms being used. The user interface may include any number of conventionally known element, such as windows, text boxes, input boxes, check boxes, radio buttons, toggle buttons, standard buttons, sliders, touch-sensitive areas, drop-down menus, and the like.

The user interface components may be configured to provide a wide range of additional functionality.

The methods described above may be implemented in a variety of mobile devices, including, for example, cellular phones (or "smartphones"), GPS systems, e-book readers, tablet computers, netbook computers, point-of-sale devices, gaming devices, and any other apparatus that may include more than one touchscreen display. In general, however, such devices are typically special-purpose or general-purpose computing devices including one or more microprocessors, memory components, and the like as is known in the art.

Figure 2:
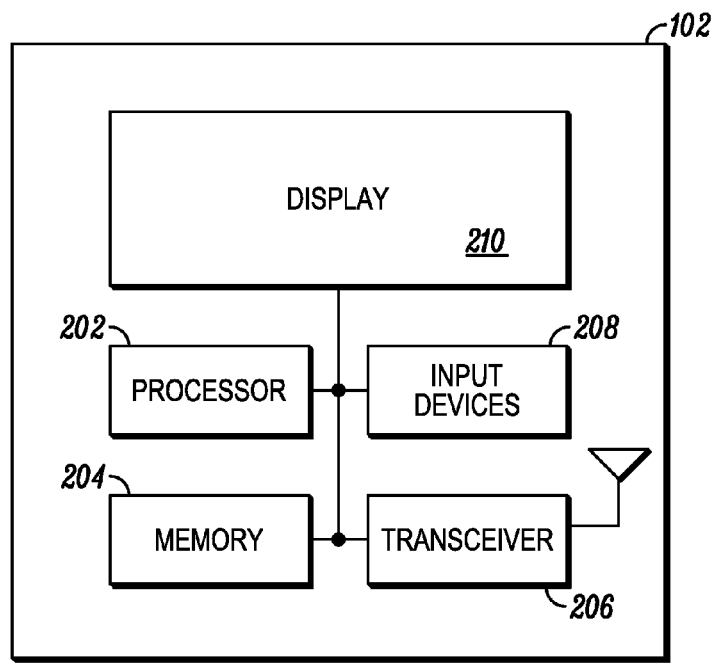
FIG. 2 is a conceptual block diagram depicting an exemplary mobile device in accordance with one embodiment.

Similarly, the systems and methods described herein may be implemented in any mobile device now known or later developed. Referring to FIG. 2, for example, a typical mobile device 102 will generally include one or more processors 202, one or more memory devices 204 (e.g., flash memory, hard drives, MicroSD cards, etc.), an RF transceiver module 206 (e.g., operating in accordance with IEEE 802.11, Zigbee, etc.), a display 210 (e.g., a touchscreen display), and input devices 208 (buttons, LEDs, etc.). In any given embodiment, additional electronic components may be present, including, typically, a power module (e.g., batteries, charging circuits, etc.), a peripheral interface, one or more external ports 412 (e.g., USB, Firewire, etc.), an audio module, and one or more sensors such as acceleration sensors, orientation sensors, and proximity sensors (not illustrated).

In general, a computer program product in accordance with one embodiment comprises a computer usable medium (e.g., memory 204, an optical drive, a USB drive, or the like) having computer-readable program code embodied therein, wherein the computer-readable program code is adapted to be executed by processor 202 (working in connection with an operating system) to implement a method for generating a user interface and/or implementing the method described above. In this regard, the program code may be implemented in any desired language, and may be implemented as machine code, assembly code, byte code, interpretable source code or the like (e.g., via C, C++, Java, Actionscript, Objective-C, Javascript, CSS, XML, etc.).

Accordingly, what has been presented are systems and methods that allow generic messaging within the context of, for example, mobile devices communicating via a SUPL protocol.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient and edifying road map for implementing the described embodiment or embodiments. It should be understood that various changes can be made in the function and arrangement of elements without departing from the scope of the invention and the legal equivalents thereof.

What is claimed is:

1. A method for providing a geolocation-related pipeline over a network between a first mobile device, a second mobile device, and a server, the method comprising:
   initiating, via the first mobile device, the geolocation-related pipeline by establishing a first data connection between the first mobile device and the server, and sending a first message to the server, wherein the first message includes a payload and a specified duration;
   establishing a second data connection between the second mobile device and the server in response to the first message;
   sending a second message from the server to the second mobile device via the second data connection, wherein the second message includes the payload, and
   selectably maintaining both the first and second data connections to form the geolocation-related data pipeline for the specified duration between the first mobile device and the second mobile device via the server;
   wherein the server and the first and second mobile devices are configured to communicate in accordance with a secure user plane location (SUPL) protocol; the server is a SUPL location platform; the first mobile device is a SUPL enabled terminal; and the second mobile device is a SUPL-enabled terminal.

2. The method of claim 1, wherein the payload is carried by a data delivery message comprising a SUPL message for geolocation data delivery.

3. The method of claim 1, wherein the server is configured to open a data connection with the first and second mobile devices via SUPL messages comprising a SLP-to-SET data connection message and a SET-to-SLP data connection acknowledgement message.

4. The method of claim 1, wherein the duration parameter corresponds to either a number indicative of a desired timeframe or a value indicative of a persistent session.

5. The method of claim 1, wherein, for the duration of the geolocation-related pipeline's operation, each mobile device is configured to send a plurality of the payloads over the geolocation-related pipeline to the other mobile device via the server.

6. The method of claim 1, wherein the geolocation-related data pipeline, via the payloads of a plurality of data delivery messages, implements ad-hoc functional extensions to the SUPL protocol.

7. The method of claim 1, wherein the geolocation-related data pipeline, via the payloads of a plurality of data delivery messages, is configured to implement a SET-to-SET software protocol that is not part of the SUPL protocol.

8. A method for providing a geolocation-related pipeline over a network between a first mobile device, a second mobile device, and a server, the method comprising:
   initiating, via the first mobile device, the geolocation-related pipeline by establishing a first data connection between the first mobile device and the server, and sending a first message to the server, wherein the first message includes a payload and a specified duration;
   establishing a second data connection between the second mobile device and the server in response to the first message;
   sending a second message from the server to the second mobile device via the second data connection, wherein the second message includes the payload, and
   selectably maintaining both the first and second data connections to form the geolocation-related data pipeline for the specified duration between the first mobile device and the second mobile device via the server;
   wherein the server and the first and second mobile devices are configured to communicate in accordance with an OMA Secure User Plane Location (SUPL) protocol; the server is a SUPL Location Platform (SLP); the first mobile device is a SUPL enabled terminal (SET); and the second mobile device is a SET;
   wherein the payload is carried by a data delivery message comprising a SUPL message for geolocation data delivery; and
   wherein the data delivery message incorporates an identification of both a sending mobile device and a recipient mobile device.

* * * * *